(12) United States Patent
Jackson et al.

(10) Patent No.: US 7,295,106 B1
(45) Date of Patent: Nov. 13, 2007

(54) SYSTEMS AND METHODS FOR CLASSIFYING OBJECTS WITHIN A MONITORED ZONE USING MULTIPLE SURVEILLANCE DEVICES

(75) Inventors: John Jackson, Gainesville, GA (US); Maksim Ershtein, Atlanta, GA (US); Alexandre Danileiko, Suwanee, GA (US); Curtis Evan Ide, Roswell, GA (US); Jonathan Heller, New York, NY (US)

(73) Assignee: Siemens Schweiz AG, St. Gallen (CH)

( * ) Notice: Subject to any disclaimer, the term of this patent is extended or adjusted under 35 U.S.C. 154(b) by 169 days.

(21) Appl. No.: 10/711,252

(22) Filed: Sep. 3, 2004

Related U.S. Application Data

(60) Provisional application No. 60/499,974, filed on Sep. 3, 2003, provisional application No. 60/502,150, filed on Sep. 11, 2003.

(51) Int. Cl.
*G08B 23/00* (2006.01)
(52) U.S. Cl. ............... 340/517; 340/572.1; 340/573.1; 340/573.4; 340/5.8
(58) Field of Classification Search ............ 340/572.1, 340/5.92, 5.8, 5.81, 573.4, 573.1, 541, 565, 340/517, 521–523
See application file for complete search history.

(56) References Cited

U.S. PATENT DOCUMENTS

| | | | |
|---|---|---|---|
| 5,019,802 A * | 5/1991 | Brittain et al. | 340/522 |
| 6,028,626 A * | 2/2000 | Aviv | 348/152 |
| 6,697,104 B1 * | 2/2004 | Yakobi et al. | 348/143 |
| 6,987,451 B2 * | 1/2006 | McKeown et al. | 340/541 |
| 2002/0067259 A1 * | 6/2002 | Fufidio et al. | 340/541 |
| 2003/0197612 A1 * | 10/2003 | Tanaka et al. | 340/572.1 |
| 2005/0024206 A1 * | 2/2005 | Samarasekera et al. | 340/541 |
| 2005/0093697 A1 * | 5/2005 | Nichani et al. | 340/545.1 |

* cited by examiner

*Primary Examiner*—Jeffery Hofsass
*Assistant Examiner*—Hoi C. Lau
(74) *Attorney, Agent, or Firm*—Donald B. Paschburg

(57) ABSTRACT

A method and system for the classification of an object within a zone of a specified area with multiple surveillance means. The invention performs the steps of receiving a set of objects within a predefined zone area from each of at least a first and second surveillance means. Subsequently, each received set of objects is filtered to ensure that the objects in the set are comparable to the objects in the other received set. Characteristics of the received sets of objects are compared and characteristics of the objects within a received set of objects are compared to characteristics of the objects within a different set of received objects, wherein the characteristics are based upon a set of predetermined characteristics. It is determined if each object or set identified by the first surveillance means corresponds to an object or set identified by the second surveillance means.

47 Claims, 7 Drawing Sheets

SYSTEMS AND METHODS FOR CLASSIFYING OBJECTS WITHIN A MONITORED ZONE USING MULTIPLE SURVEILLANCE DEVICES

CROSS REFERENCE TO RELATED APPLICATION

This application claims priority to and the benefit of U.S. Provisional Patent Application No. 60/499,974, filed Sep. 3, 2003 and U.S. Provisional Patent Application No. 60/502,150, filed Sep. 11, 2003, the entirety of which are both herein incorporated by reference.

FIELD OF THE INVENTION

The present invention is generally relates to a surveillance system, and more particularly to a system for the classification, analysis and presentation of surveillance data.

BACKGROUND OF THE INVENTION

Presently, identifying and maintaining the secure ingress and egress to and the surveillance of various types of structures and areas is of the utmost importance. Current technologies provide numerous systems and devices that ensure only allowed people can enter specific doors or gates (i.e., biometric devices, computer identification cards, etc. . . . ). Video surveillance systems are also utilized to monitor large, open areas (i.e., storage yards, parking lots, airport taxiways, etc. . . . ). Further, radio frequency identification devices (RFID) are used to tag and detect specific individuals or items within specified areas.

Even though all of these systems provide adequate measures of security in their respective implementations within particular environments, the systems all have very important protective deficiencies. For example, video surveillance systems allow the observance of the entry or exit of an individual to an area that is under surveillance in addition to monitoring areas. However, video surveillance systems are not useful in distinguishing between people or objects that have access to a particular monitored area versus people or objects that should not have access to a particular monitored area.

Radio frequency identification device (RFID) tag security systems can be used to monitor wider areas than gateway id cards or biometric entry/exit devices. However, a security system that uses RFIDs can only see those objects or individuals that possess a RFID security tag that are registered to the system. RFID security systems are designed to limit the access of objects and individuals to areas where all relevant objects or individuals are appropriately tagged. Therefore, the systems can monitor or "see" individuals or objects that should be in a specific area. However, since intruders or trespassers would not be carrying identification tags these systems would be blind to individuals who should not be there.

Therefore, there exist a need to secure environments with large, open areas and numerous points of access. The present invention provides a system that solves this problem in a fashion that is distinct and unique from the above-mentioned current solutions. The solution is accomplished by utilizing a combination of technologies in order to provide the overall capability to see and identify all individuals or objects within a monitored area. Additionally, the present invention allows for the pinpointing and cross-referencing of the location of identified objects or individuals in order to determine the location of an intruder object or individual.

SUMMARY OF THE INVENTION

The present invention relates to a method and system for the classification of an individual or object that is located or situated within a zone of a specified area. An embodiment of the present invention relates to a method for the classification of an individual or object within a zone of a specified area with multiple surveillance means, wherein the method comprises the steps of receiving information or data corresponding to a set of objects within a predefined zone area from at least a first and second surveillance means. The information corresponding to each received object set is filtered according to a value or set of values of filter criteria in order to ensure that the objects in the set are comparable to the objects in the other received set of objects. Thereafter, characteristics of the received sets of objects are compared and further characteristics of the objects within a received set of objects are compared to characteristics of objects within a different set of received objects, wherein the characteristics are based upon a set of predetermined characteristics. Lastly, it is determined if each object identified by the first surveillance means corresponds to an object identified by the second surveillance means.

According to another aspect of the invention a further embodiment of the present invention relates to a method for the classification of an individual or object within a zone of a specified area with multiple surveillance means, wherein the method comprises the steps of receiving a set of comparable objects within a predefined zone area from each of at least a first and second surveillance means, respectively. Characteristics of the received sets of objects are compared and further, characteristics of the objects within a received set of objects are compared to characteristics of the objects within a different set of received objects, wherein the characteristics are based upon a set of predetermined characteristics. Finally, it is determined if the set of objects identified by the first surveillance means corresponds to the set of objects identified by the second surveillance means.

Another embodiment of the present invention relates to a system for the classification of an individual or object within a zone of a specified area with multiple surveillance means. The system comprises a first surveillance means, wherein the first surveillance means observes a set of objects that are located within a predefined zone area. A second surveillance means is also utilized, wherein the second surveillance means observes a set of objects within a predefined zone area. A processing means is in communication with the first surveillance means and the second surveillance means. The processing means receives information corresponding to the observed set of objects from the first and second surveillance means and filters out any incomparable objects and then compares characteristics of the filtered sets of objects. The processing means further compares characteristics of the objects within each filtered set of objects to characteristics of the objects within a different filtered set of received objects, wherein the characteristics are based upon a set of predetermined characteristics. The processing means further determines if each object in the filtered set identified by the first surveillance means corresponds to an object in the filtered set identified by the second surveillance means.

A yet further embodiment of the present invention relates to a system for the classification of an individual or object within a zone of a specified area with multiple surveillance means. The system comprises a first surveillance means, wherein the first surveillance means observes a set of objects that are located within a predefined zone area. A second surveillance means observes a set of objects within a predefined zone area. Further, a processing means is in communication with the first surveillance means and the second surveillance means, wherein the processing means receives the observed set of objects and filters out any incomparable objects. The processing means also compares characteristics of the filtered set of objects in addition to comparing characteristics of the objects within each filtered set of objects to characteristics of the objects within a different filtered set of received objects. The characteristics are based upon a set of predetermined characteristics. The processing means further determines if each filtered set of objects identified by the first surveillance means corresponds to a filtered set of objects identified by the second surveillance means.

According to various aspects of the present invention, the steps of receiving objects or sets of objects comprises the steps of receiving information or data corresponding to objects or sets of real objects from sensors, or from data storage means or communication means operatively associated with such sensors, and processing such information in a computer system.

DETAILED DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION

One or more exemplary embodiments of the invention are described below in detail. The disclosed embodiments are intended to be illustrative only since numerous modifications and variations therein will be apparent to those of ordinary skill in the art. In reference to the drawings, like numbers will indicate like parts continuously throughout the views.

The present invention relates to a system and method for observing, monitoring and tracking a set of objects or individuals (hereinafter collectively referred to as objects) that are situated within a specific predetermined place (i.e., an office) or geographic area using a plurality of technologically differing surveillance or sensor means comprised of active or passive devices. The invention divides the predetermined place or geographic area into specific zone areas, wherein each surveillance means utilized within the invention monitors the zone area. Sets of objects are received from the surveillance devices, and data obtained from each surveillance means is analyzed by the invention and subsequently displayed to a system user in addition to being used to make policy decisions within the invention.

Figure 4:
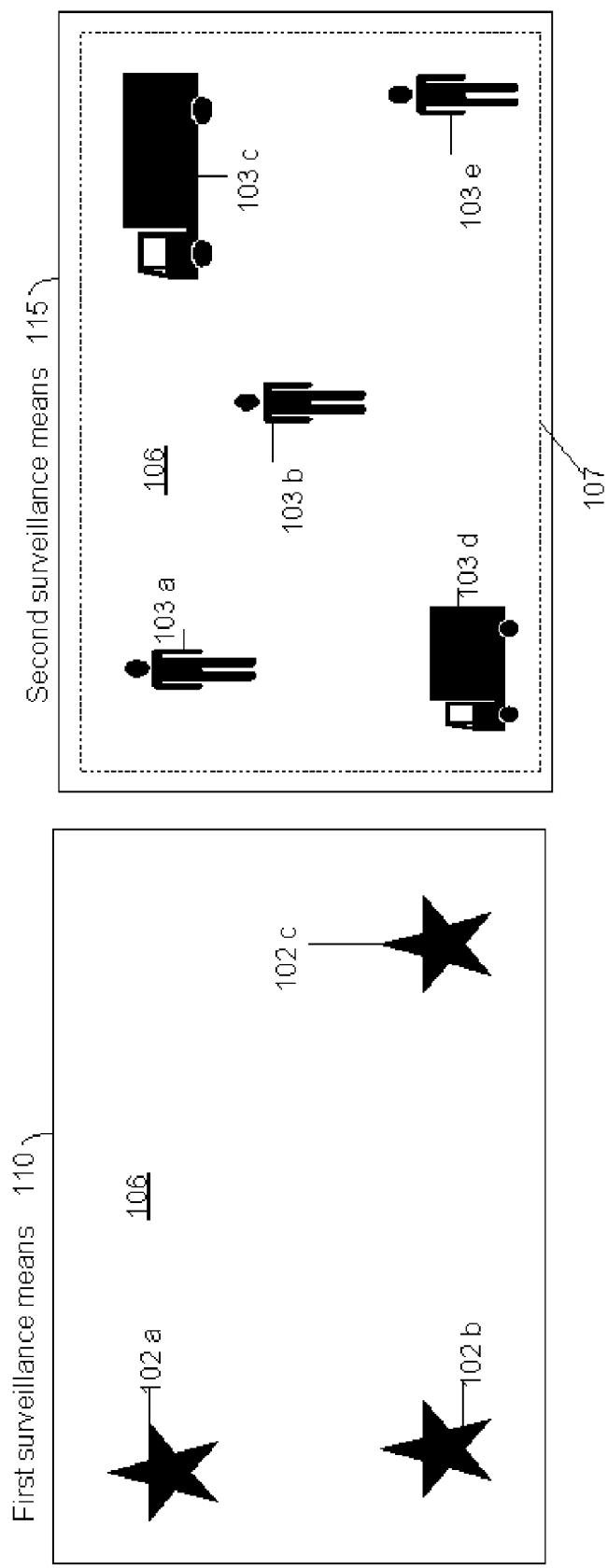
FIG. 4 is a diagram illustrating an object location function that may be used implemented within embodiments of the present invention.

For example, the present invention observes, monitors and tracks a set of objects within a zone area using at least two surveillance means. As illustrated in FIG. 4, the first surveillance means would provide the location and identity of the objects within a grouping of a set of objects within a zone area. Any object that is to be recognized by the invention will be supplied with a passive or active identification tag or card, wherein the identification tag or card will be associated with an identification profile utilized within the invention that contains identification and classification data that is specified for the object. The associated identification profile may include useful object characteristic information such as object type, name, identity, size, weight, color, and various other descriptive information useful in comparing and contrasting unidentified objects to determine whether they are similar to the identified, profiled object. Various technologies may be implemented to recognize an identification tag or card and provide location and identity data in regard to an object, technologies including but not limited to a radio frequency identification (RFID), global positioning system (GPS), radio direction finder (RDF) and an identification friend or foe (IFF) system.

The second surveillance means would comprise a digital video processing system, wherein the second surveillance means would provide a video a feed of field-of-view within a specified zone area and the objects located therein. Alternative embodiments of the invention could utilize, but are not limited to radar, microwave, IR or an EM wave based output of a grouping of a set of objects that are observed within a zone area in order to provide data in regard to the objects.

Figure 6:
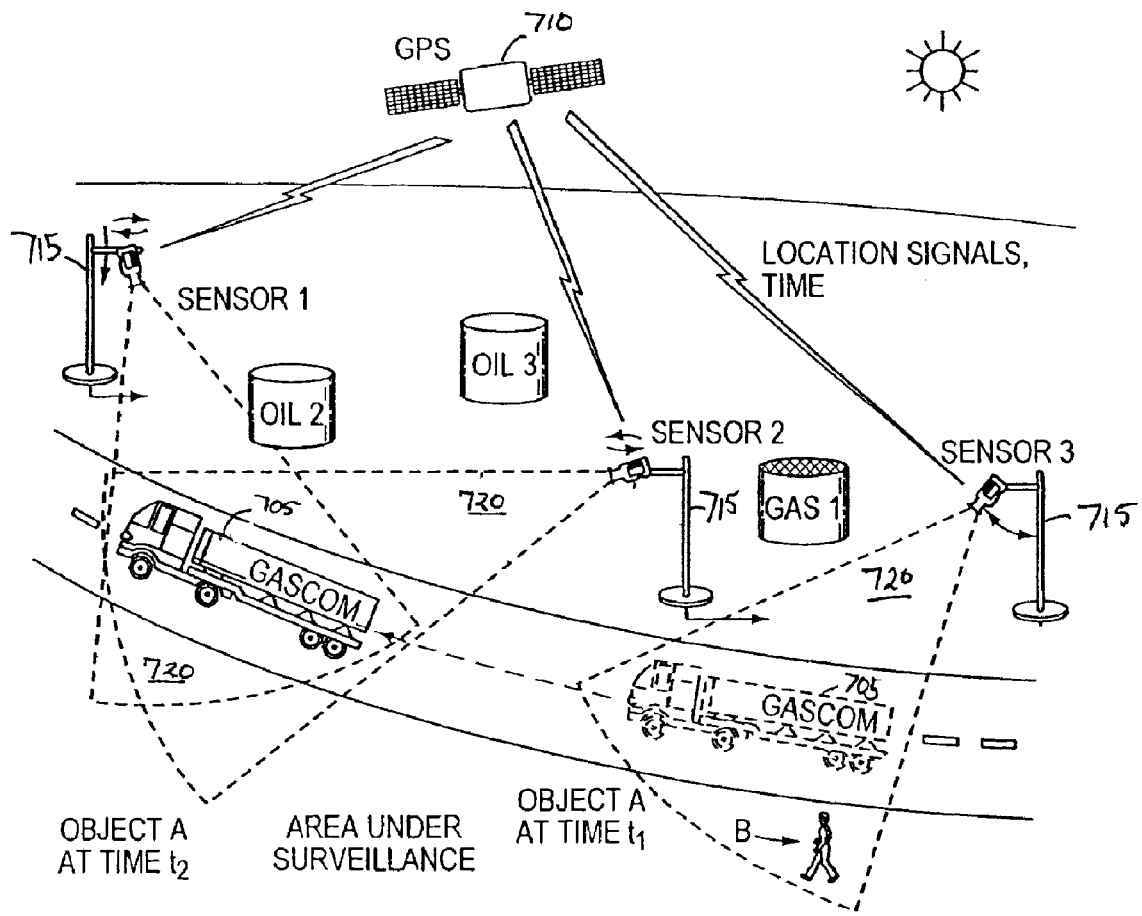
FIG. 6 is a diagram illustrating an area that is under surveillance such as would be monitored by an embodiment of the present invention.
Figure 6:
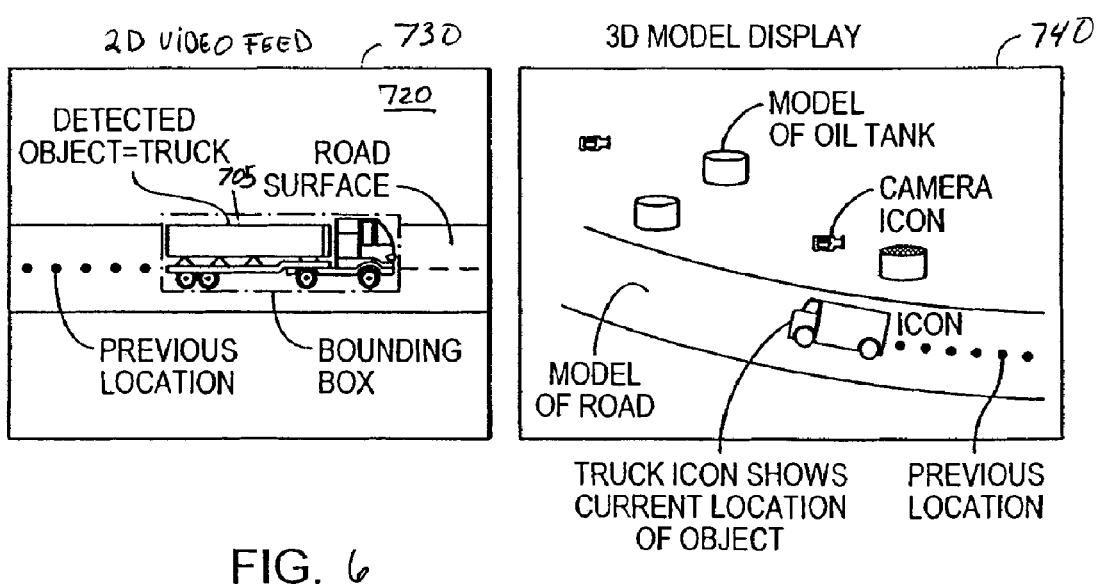
Figure 7:
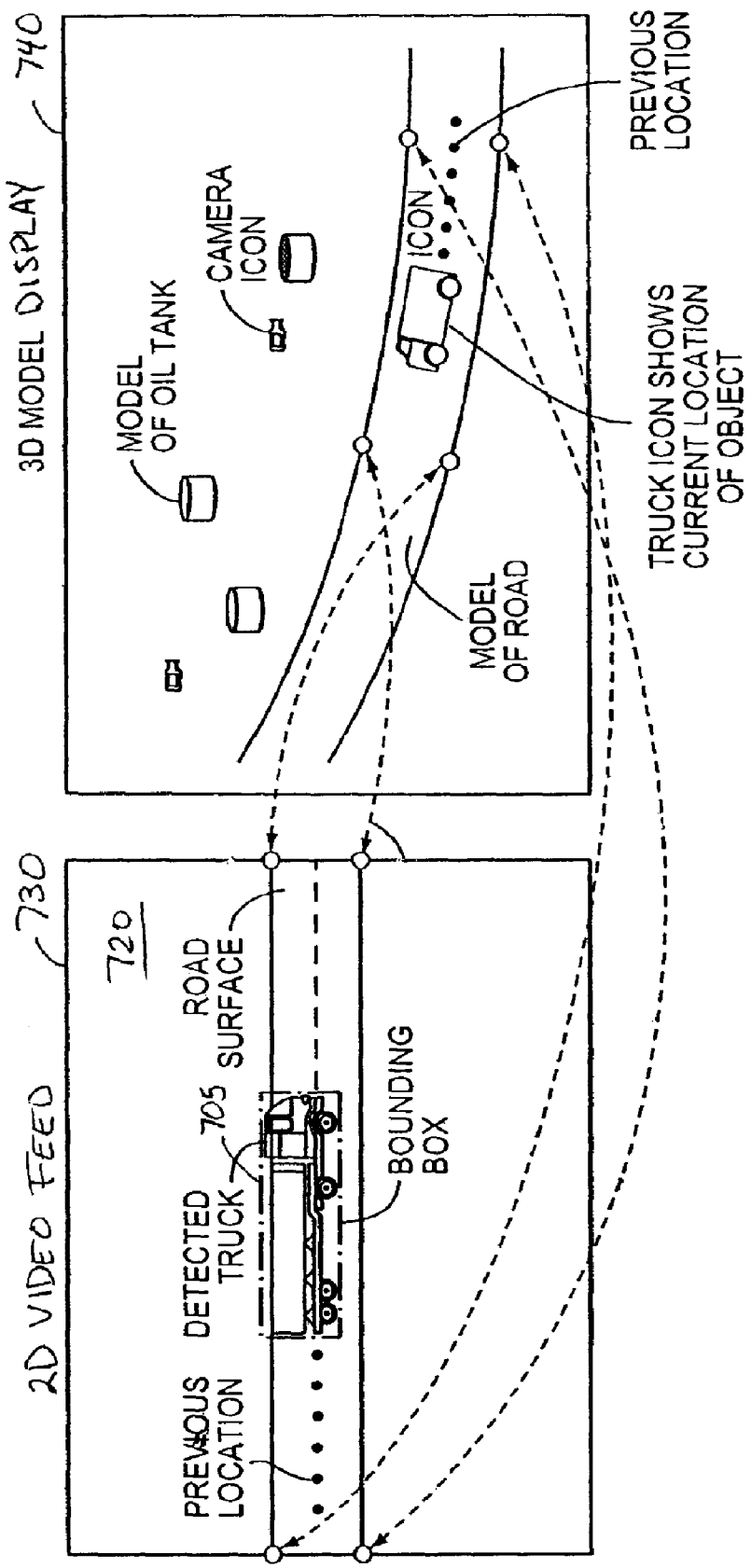
FIG. 7 is a diagram illustrating a surveillance video view and a 3D model of an area under surveillance by use of an embodiment of the present invention.

The purpose of the digital video processing system is to obtain a video feed of the field-of-view and to detect any objects within the field-of-view. Further, the digital video processing system has the capability to determine the location of objects within the field-of-view in addition to any pre-specified characteristics of the objects in the field-of-view. Object characteristics used in any determination made by the system could include, but are not limited to, the size of the object, the direction in which the object is moving, the shape of the object, the type of object and the color of the object. Additionally, the digital video processing system would be equipped with the capability to register the location of observed objects and map the physical location of an observed object in a 3D map environment (FIGS. 6 and 7).

Specific examples of a digital video processing system that may be utilized within the present invention are detailed further in U.S. patent application Ser. No. 10/237,202 entitled "Surveillance System Control Unit," and U.S. patent application Ser. No. 10/079,639 entitled "Surveillance System," and U.S. patent application Ser. No. 10/888,578 entitled "Environmentally Aware Intelligent Surveillance Device," all of which are herein in their entirety incorporated by reference. Further, a method and system for correlating a location within an area that is under surveillance as the area is depicted within a 2D view of the area as captured by a video camera, to a corresponding location within a 3D model of the area under surveillance is disclosed in U.S. patent application Ser. No. 10/888,578 in addition to U.S.

patent application Ser. No. 10/676,395 entitled "System and Method for Interpolating Coordinate Value Based Upon Correlation between 2D Environment and 3D Environment," the entirety of which is herein incorporated by reference (all of such identified applications hereinafter referred to as the "Incorporated Applications.")

Presently, there are commercially available surveillance systems that perform the functions of object detection and the identification of object characteristics. For example, commercially available video analysis systems useful in constructing embodiments of the invention are described in U.S. Pat. No. 6,696,945, which provides for object detection and recognition implemented by obtaining data from a sensing device and analyzing the data obtained from the sensing device. Similarly, U.S. Pat. Nos. 6,097,429 and 6,091,771 provide for the implementation of a video security system that takes snapshots of a field-of-view in the event an intrusion is detected. However, the present invention moves past the concepts of these approaches by using a location based surveillance data in conjunction with visual data to determine the classification and identity of an object.

Initially, the present invention filters each received object set (or data corresponding thereto) according to a value or set of values of filter criteria in order to ensure that the objects in the set are comparable to the objects in the other received set of objects. The specific purpose of the filtering step is to ensure that all objects that are to be compared within the system are indeed comparable. Matching or consistent object characteristics must be associated with each object in order for the object to further be considered for further comparison functions within the system. Predetermined object characteristics must be fulfilled by each object in order for the object to further be considered for further comparison functions within the system. Objects can be judged according to, but not limited to, characteristics such as object size, movement direction of the object, object shape, object type and object color.

Figure 5:
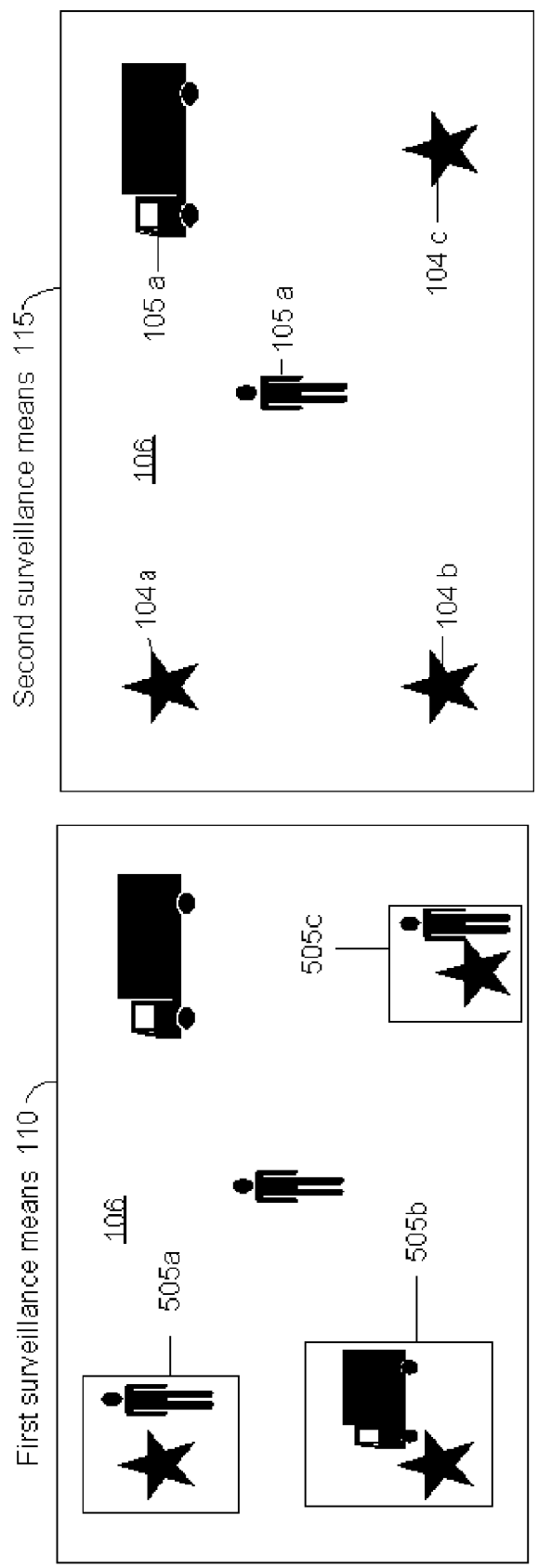
FIG. 5 is a diagram illustrating a further object location function that may be implemented within embodiments of the present invention.

After the filtering step, the location and visual data acquired from the differing types of surveillance means are processed and harmonized by the invention through the use a surveillance data fusion technique. For example, as illustrated in FIG. 5, the present invention needs to be able to distinguish between an intruder or "unfriendly" object and an allowed or "friendly" object. A possible scenario would involve equipping friendly objects with a GPS device, wherein the GPS device will intermittently transmit geographical information pertaining to the friendly object to a central processor means. Therefore, the location of an object could be specified and determined to be located in a specific area or predetermined zone area.

Distinguishing friendly objects from unfriendly objects is a useful purpose of the present invention, however, the invention's benefit is not limited just to making this determination. By using different types of surveillance means, providing more plentiful and more accurate object characteristic data and using more than two surveillance means, the present invention can easily be extended to make additional determinations in regard to the consistency and matching of objects across multiple surveillance means in addition to determinations on the consistency and matching of sets of objects across the multiple surveillance means.

Moreover, these determinations may be carried out as an iterative process where the initial determination is made as described in the invention disclosure and the process is iterated again and again using additional observations of the object characteristics from the multiple surveillance means. With each iteration, the decision may acquire a higher level of certainty or the decision may be revised to an alternate outcome based on the additional observations. Additional determinations may follow a state transition flow that follows clear decision criteria for transition from one state to another based on the object and object set comparisons.

The acquired geographic data is complemented with data received at a digital video processing system, the system monitoring and analyzing a video feed of the area or zone where the tracked object has been determined to be located. However, all of the acquired data has to be "fused" in order to assign a friendly classification designator that is associated with a tracked object to an object that has been visually detected. This particular aspect of the invention is accomplished through a series of determinations that are made within the processor that is implemented within the invention. The invention makes a determination based upon the detected position of an object by the first surveillance means and the determined position of the object based upon the video feed of the object's location within a specified area or zone. This decision is based upon the invention determining if two detected objects (an object detected by the first and second surveillance means) are in the same physical location.

As further illustrated in FIG. 5, distance criteria or zones of uncertainty 505 (e.g. 505a, 505b, 505c) are used to aid in determining if the two objects are indeed the same object. These criteria are preferably based upon the vicinity of the object from the digital processing system. The accuracy of determining the geographic coordinates of the detected object decreases with the distance of the object from the surveillance means. Therefore, a calculation is performed that takes into account the distance of the object from the video surveillance means. The resulting factor is called the fusion factor, wherein it has been empirically found that the fusion factor should be approximately in the range of 3 to 5 percent of the distance between the surveillance device and the object.

Therefore, if two objects are determined to be within a predetermined distance or co-located in regard to their position to one another, then the two objects are assumed to be the same object. As a result of determining that the two objects are the same object, the object that has been visually observed is designated with a profile that corresponds to the profile of the object that was geographically located. Accordingly, objects that are located within a zone area by a surveillance means that do not have a corresponding counterpart in a differing surveillance means can be flagged by the invention as "unfriendly," while all other objects can be designated as "friendly." The discovery of any unfriendly object would subsequently lead to the initiation of a series of policy decisions wherein the system would decide whether to initiate an alarm function, notify security personnel or execute other investigative security steps.

In addition to using object co-location as the primary decision-criteria for deciding that two objects are the same object, other object criteria can be used. For example, object characteristics such as size, direction, shape, object type, object color, and virtually any object criteria that can be provided by each of the two surveillance means can be used as further comparison criteria in the decision whether two objects are the same object.

In accordance with one aspect of the invention, all or at least some of the surveillance means utilized within the present invention are equipped with the capability to determine a numerical count of the objects received at the surveillance devices. The same security policy decisions can be initiated if the numerical count of the objects received by the surveillance means is determined to be not equal. The invention can therefore make a policy determination in regard to the objects based upon the location or numerical count of specific individual objects or sets of objects. Further, it is also possible to use additional object characteristics available from both surveillance means as comparison criteria in count-based decision-making.

Whereas the count of objects within a zone can be used to determine object set correspondence, this is not the only measure that can be used. Other statistical and mathematical measures about sets of objects such as average count, standard deviation of the count, and various other measures that one skilled in the art of set theory and statistical comparison may know can easily be used in place of comparing the counts of objects within the sets being compared. These additional measures become increasingly valuable as the process of comparison becomes iterative as additional observation sets become available as described above.

The processing means utilized within the present invention includes systems (not shown) for receiving, compiling and storing data that has been received from the surveillance means. The processing means includes a database (not shown) that is in communication with a processing unit, wherein profiles that are associated with passive or active identification tags or cards are stored within the database.

According to another aspect of the invention, the present invention further provides for the logging, storage and display of received surveillance data. The surveillance data represents all the objects that have been received at the surveillance means. The processing means has the capability of using the object data obtained from the video feed or radar/EM output to construct a 2D map of the observed zone area. FIGS. 6 and 7 illustrate how 2D data obtained by a video feed is subsequently used in conjunction with the obtained object location data to construct a 3D map of a zone area, wherein the 3D map is displayed upon a display device (not shown), as described in one or more of the Incorporated Applications. FIG. 6 shows a vehicle 705 that is equipped with a GPS transponder (not shown), wherein a GPS satellite 710 constantly monitors the location of the vehicle 705. Further, video surveillance sensor means 715 visually monitors the zone areas 720 through which the vehicle 705 travels. FIGS. 6 and 7 further show representations of the 2D video feed data 730 obtained by the surveillance sensor means 715 and the subsequently constructed 3D map 740 of a zone area 720.

The 3D map 740 can display the time, location and status of the count of the objects within a zone area received at the surveillance devices throughout a monitored period. The invention further has the capability to analyze and track the path of movement of received objects and record the object's movement as a function of location and time in addition to identifying any object that has been in a location in a specific zone area at a specific time, wherein representations of all of these functions may be displayed at the display device. Details are provided in the Incorporated Applications.

According to another aspect, the invention also has the capability to store, enhance, copy and digitally distribute any relevant images and image data that are obtained from a video feed obtained from a surveillance means, wherein the image data may include images of objects that have been classified as friendly and unfriendly. For example, during a security personnel notification function, the security personnel could be automatically transmitted images of an unfriendly object as observed within real time.

The present invention as embodied fits seamlessly into any surveillance system that has the capability to implement multiple surveillance devices, wherein the data that is accumulated from the devices is used to make and determine policy decisions within the surveillance system and any actions that may result from the decisions. For example U.S. patent application Ser. No. 10/236,819 entitled "Security Data Management System," the entirety of which is herein incorporated by reference, discloses a surveillance system wherein multiple sensor devices may be implemented within the system (also hereby included as one of the "Incorporated Applications.") The data acquired by the sensors is subsequently used to aid in determinations made by an alarm engine, alarm action engine and a tracking engine used within the invention. The present could easily be assimilated to work in conjunction with such a surveillance system without excessive technical modifications to existing system hardware or software.

Figure 2:
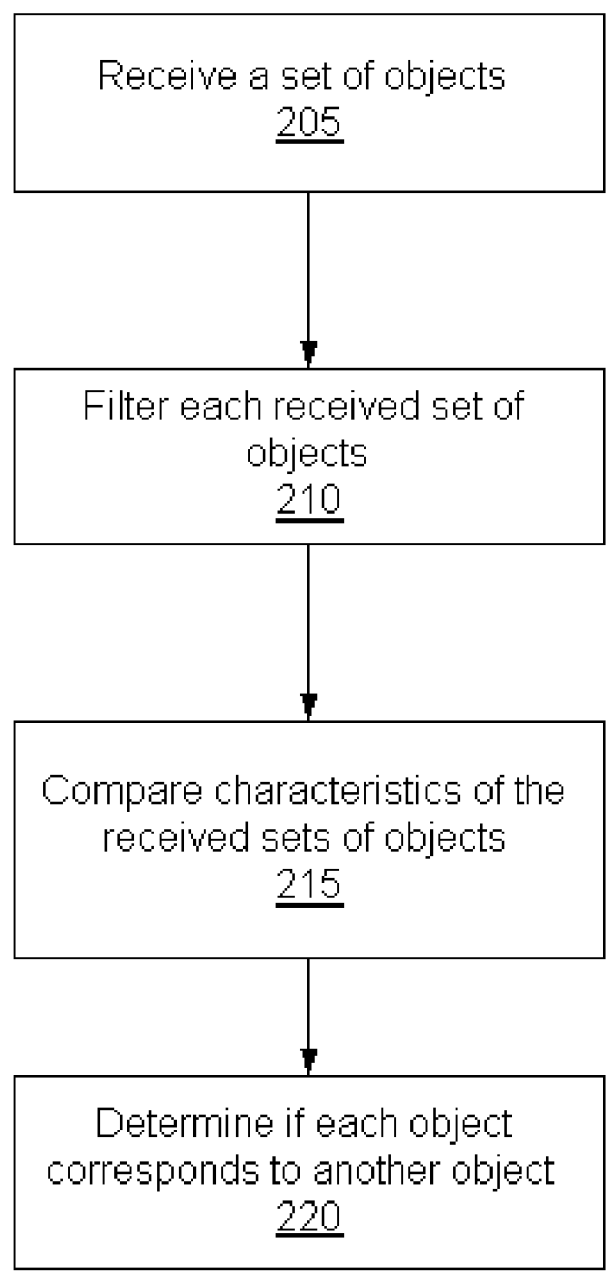
FIG. 2 is a flow diagram of a method that relates to embodiments of the present invention.

The present invention is initially described in reference to FIGS. 2, 4 and 5. FIG. 2 illustrates a method that may be implemented within an embodiment of the present invention. FIG. 2 shows at step 205 that a set of objects 102, 103 within a predefined zone area 106 are received from each of at least a first and second surveillance means 110, 115, wherein according to various aspects of the present invention, the steps of receiving objects or sets of objects comprises the steps of receiving information or data corresponding to objects or sets of real objects from sensors, or from data storage means or communication means operatively associated with such sensors, and processing such information in a computer system. Next, at step 210, each received set of objects 102, 103 is filtered according to a value or set of values of filter criteria in order to ensure that the objects in the set are comparable to the objects in the other received set of objects 102, 103, as hereinabove described.

At step 215 the characteristics of the received sets of objects 102, 103 are compared and additionally the characteristics of the objects 102 within a received set of objects 102 are compared to the characteristics of the objects 103 within a different set of received objects 103, wherein the characteristics are based upon a set of predetermined characteristics. Lastly, at step 220, it is determined if each object 102 identified by the first surveillance means 110 corresponds to an object 103 identified by the second surveillance means 115. The objects 102 identified by the first surveillance means 110 comprise at least one of an active identification device or a passive identification device, wherein each device comprises an associated profile, as described above.

An aspect of the presently described method further includes a step wherein the first and second surveillance means 110, 115 determine the geographic location of the received objects 102, 103. This particular feature may be accomplished using any of the above-mentioned object location devices or systems. Further, a video feed of a field-of-view 107 of the predefined zone area 106 is provided by the second surveillance means 115.

Further aspects of the present method determine if an object 102 received by the first surveillance means 110 is within a predetermined measure of distance from an object 103 received by the second surveillance means 115. If it is determined that an object 102 received by the first surveillance means 110 is within a predetermined distance from an object 103 identified by the second surveillance means 115 then the two objects 102, 103 are assumed to be the same object 104. The predetermined distance is calculated by the fusion factor. In the event that the two objects 102, 103 are determined to be the same object 104, then the assigning the object 103 received by the second surveillance means 115 is assigned and identified with a profile of the object 102 received by the first surveillance means 110.

In the instance that an object 103 is identified, the identified object 103 is classified within the invention as a friendly object 104. There is no resultant policy decision nor initiated alarm condition. However, if an object 103 is not identified as corresponding to an object 102, then an alarm condition is initiated within the invention and the object 103 is classified as an unfriendly object 105.

The video feed of the field-of-view 107 of the predefined zone area 106 that is provided by the second surveillance means 115 is subsequently used to construct a 2D map of the predetermined zone area 106. The 2D map features the specific position location of the objects 103 that are present in the video feed. Further, object location data acquired from the first and second surveillance means 110, 115 is utilized in conjunction with the video feed data of the objects 103 received at the second surveillance means 115 and used to construct a 3D map of the predetermined zone area 106. The objects and the position of the objects that have previously been designated as friendly and unfriendly objects 104, 105 within the zone area 106 are displayed upon the 3D map. Thereafter, the invention tracks the movements of the friendly and unfriendly objects 104, 105 and displays each object's 104, 105 respective path of movement and the time of the object's 104, 105 movement on the 3D map of the zone area 106.

Figure 3:
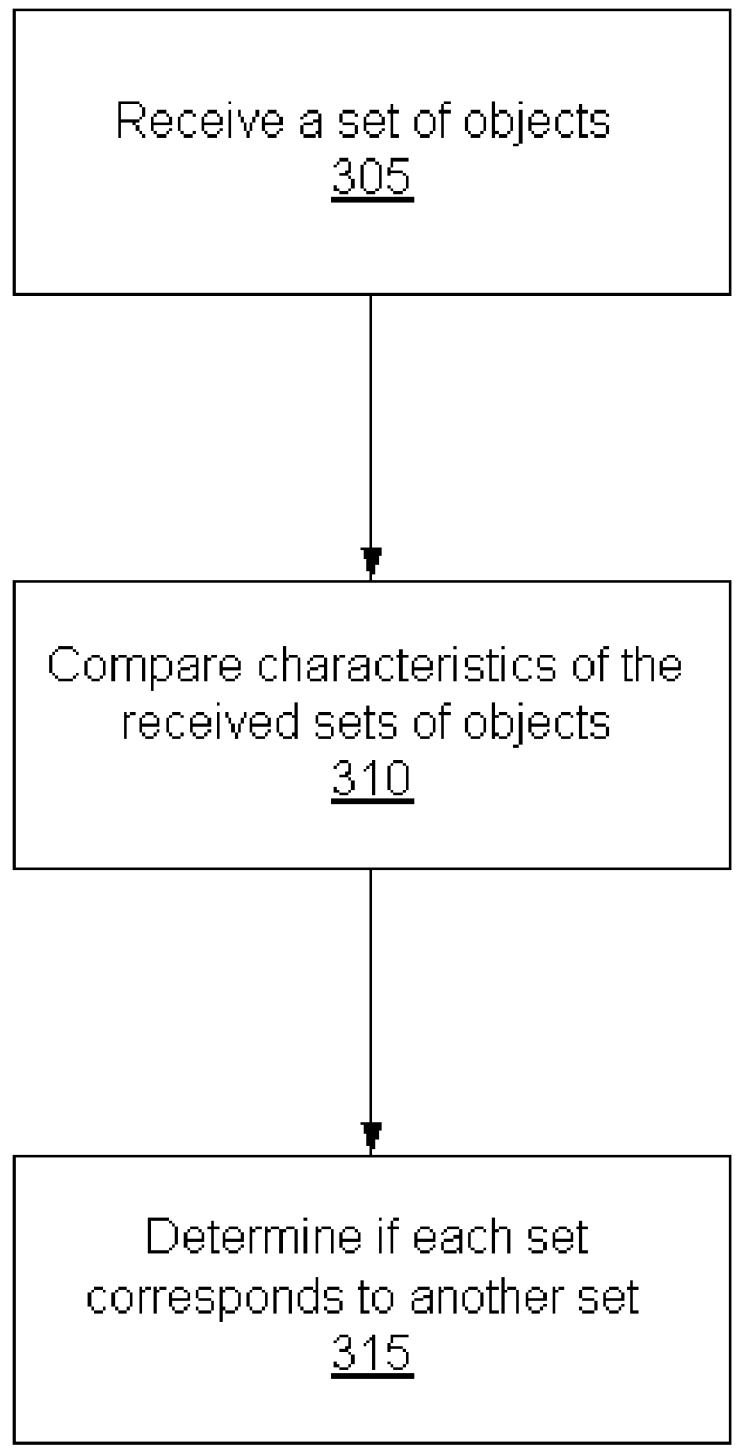
FIG. 3 is a flow diagram of a method that relates to embodiments of the present invention.

FIG. 3 illustrates a flow diagram that presents another embodiment of the present invention. At step 305*a* set of comparable objects 102, 103 within a predefined zone area 106 is received from a first and second surveillance means 110, 115. As mentioned above, according to various aspects of the present invention, the steps of receiving objects or sets of objects comprises the steps of receiving information or data corresponding to objects or sets of real objects from sensors, or from data storage means or communication means operatively associated with such sensors, and processing such information in a computer system.

Next, at step 310, the characteristics of the received sets of objects 102, 103 are compared. Further, the characteristics of the objects 102 within a received set of objects 102 are compared to the characteristics of the objects 103 within a different set of received objects 103, wherein the characteristics are based upon a set of predetermined characteristics. Lastly, at step 315, it is determined if the set of objects 102 identified by the first surveillance means 110 corresponds to the set of objects 103 identified by the second surveillance means 115. The objects 102 identified by the first surveillance means 110 comprise at least one of an active identification device or a passive identification device, wherein each device comprises an associated profile, as described above.

An aspect of this embodiment of the invention provides for the second surveillance means 115 to obtain a video feed of a field-of-view 107 of the predefined zone area 106. Further, the number of objects 102 within a set of objects 102 that have been received by the first and second surveillance means 110, 115 are determined. The number of objects 102 received by the first surveillance means 110 are compared to the number of objects 103 received by the second surveillance means 115 in order to determine if the total numbers of received objects 102, 103 are equal or not equal.

In the event that if it is determined that the numbers of objects 102, 103 received at the first and second surveillance means 110, 115 are equal then no action is taken. Conversely, if it is determined that the number of objects 102, 103 received at the first and second surveillance means 110, 115 are not equal then an alarm condition is initiated.

The video feed of the field-of-view 107 of the predefined zone area 106 that is provided by the second surveillance means 115 is subsequently used to construct a 2D map of the predetermined zone area 106 in accordance with Incorporated Applications. The 2D map features the specific position location of the objects 103 that are present in the video feed. Further, object location data acquired from the first and second surveillance means 110, 115 is utilized in conjunction with the video feed data of the objects 103 received at the second surveillance means 115 and used to construct a 3D map of the predetermined zone area 106. Thereafter, the invention tracks the movements of the friendly and unfriendly objects 104, 105 and displays each object's 104, 105 respective path of movement and the time of the object's 104, 105 movement on the 3D map of the zone area 106.

Figure 1:
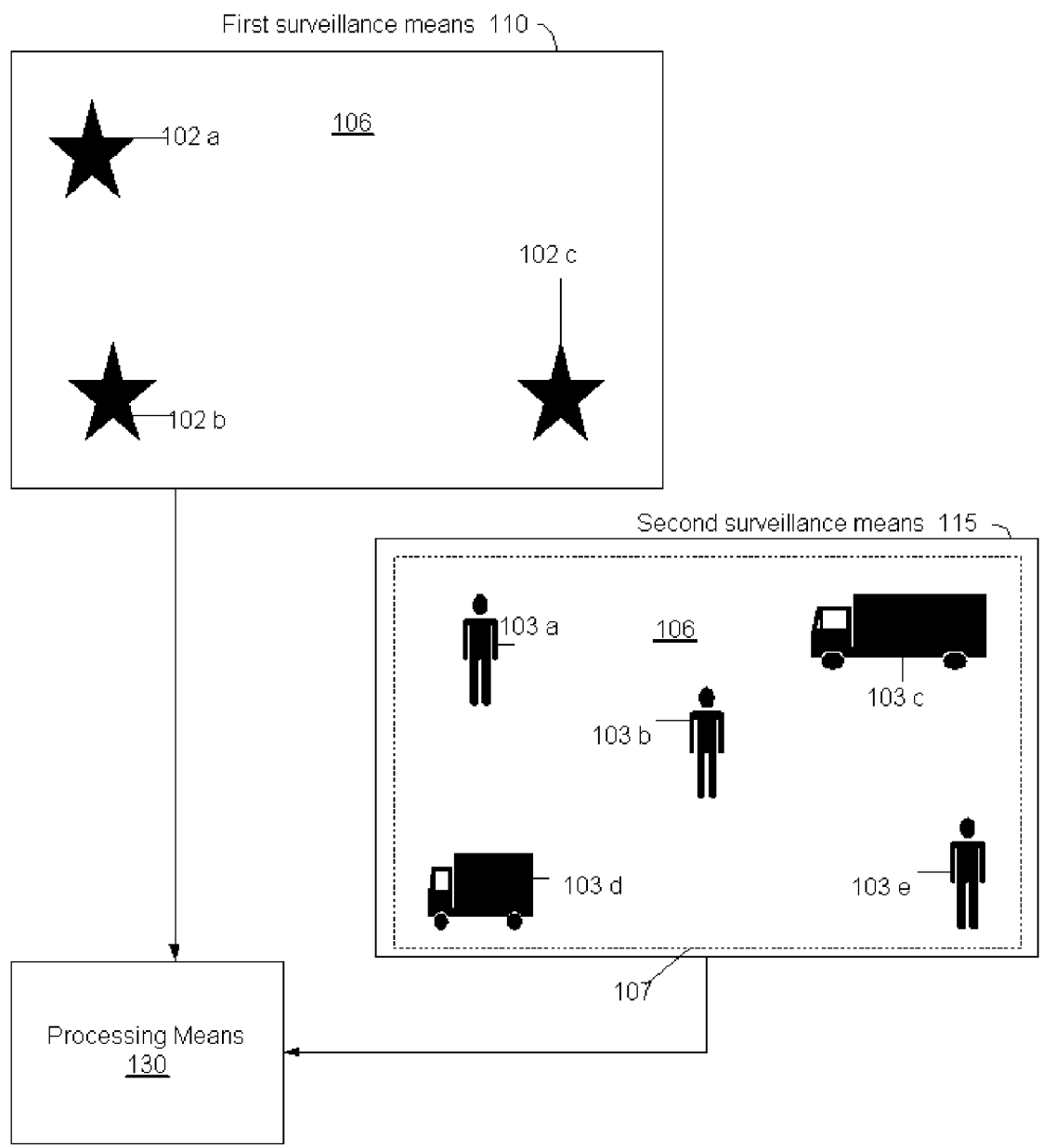
FIG. 1 is a diagram illustrating an embodiment of the present invention.

FIG. 1 illustrates an embodiment of a system for the classification of an individual or object within a zone of a specified area with multiple surveillance means. The system comprises a first surveillance means 110, wherein the first surveillance means 110 observes a set of objects 102 within a predefined zone area 106, and a second surveillance means 115, wherein the second surveillance means 115 observes a set of objects 103 within a predefined zone area 106. A processing means 130 is in communication with the first surveillance means 110 and the second surveillance means 115.

The processing means 130 receives the observed set of objects 102, 103 from the first and second surveillance means and filters out any incomparable objects. The processing means 130 then compares the characteristics of the filtered sets of objects 102, 103. Additionally, the processing means 130 further compares the characteristics of the objects 102 within each filtered set of objects 102 to the characteristics of the objects 103 within a different filtered set of received objects 103, wherein the characteristics are based upon a set of predetermined characteristics. Lastly, the processing means 130 determines if each object 102 in the filtered set identified by the first surveillance means 110 corresponds to an object 103 in the filtered set identified by the second surveillance means 115.

A yet further embodiment of the present invention relates to a system comprising a first surveillance means 110, wherein the first surveillance means 110 observes a set of objects 102 within a predefined zone area 106, and a second surveillance means 115, wherein the second surveillance means 115 observes a set of objects 103 within a predefined zone area 106. A processing means 130 is in communication with the first surveillance means 110 and the second surveillance means 115. The processing means 130 receives the observed set of objects 102, 103, filters out any incomparable objects, and then compares the characteristics of the filtered set of objects 102, 103. The processing means 130 further compares the characteristics of the objects 102 within each filtered set of objects 102 to the characteristics of the objects 103 within a different filtered set of received objects 103, wherein the characteristics are based upon a set of predetermined characteristics. The processing means 130 further determines if each filtered set of objects 102 identified by the first surveillance means 110 corresponds to a filtered set of objects 103 identified by the second surveillance means 115.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for the classification of an individual or object within a zone of a specified area with multiple surveillance devices wherein the method comprises the steps of:
   receiving a first set of objects from a first surveillance device and a second set of objects from a second surveillance device within a predefined zone area;
   filtering the first and second sets of objects according to a set of predetermined characteristics to ensure that the objects in the first set are comparable to the objects in the second set of objects;
   comparing characteristics of the first and second sets of objects, wherein the characteristics are based upon the set of predetermined characteristics;
   further comparing characteristics of the objects within the first set of objects to characteristics of the objects within the second set of received objects, wherein the characteristics are based upon the set of predetermined characteristics; and
   determining if each object identified by the first surveillance device corresponds to an object identified by the second surveillance device; and classifying each object identified by the first surveillance device according to rather is corresponded to an object identified by the second surveillance device; wherein the second surveillance device provides a video feed of a field-of-view of the predefined zone area; the objects identified by the first surveillance device comprises at least one of an active identification device or a passive identification device, wherein each first surveillance device comprises an associated profile.

2. The method of claim 1, further including the step of the first and second surveillance devices determining the location of the objects within the first and second set of objects.

3. The method of claim 1, wherein the video feed is used to construct a 2D map of the predetermined zone area featuring the location of the objects present in the video feed.

4. The method of claim 1, further including the step of utilizing object location data acquired from the first and second surveillance devices in conjunction with video feed data of the objects received at the second surveillance device in order to construct a 3D map of the predetermined zone area, the friendly and unfriendly objects situated within the zone area being displayed upon the 3D map.

5. The method of claim 1, wherein the step of comparing the characteristics of the filtered first and second sets of objects further comprises the step of determining if an object received by the first surveillance device is within a predetermined measure of distance from an object received by the second surveillance device.

6. The method of claim 5, wherein if it is determined that an object received by the first surveillance device is within a predetermined distance from an object identified by the second surveillance device, then the two objects are assumed to be the same object.

7. The method of claim 6, further including the step of assigning and identifying an object received by the second surveillance device with a profile of an object received by the first surveillance device if the two objects are determined to be the same object.

8. The method of claim 7, wherein if an object is identified, then no action is taken and the identified object is classified as a friendly object.

9. The method of claim 7, wherein if an object is not identified, then an alarm condition is initiated and the object is classified as an unfriendly object.

10. The method of claim 1, wherein the first surveillance device and the second surveillance device are different types of devices.

11. A method for the classification of an individual or object within a zone of a specified area with multiple surveillance devices, wherein the method comprises the steps of:
   receiving a first set of comparable objects from a first surveillance device and a second set of comparable objects from a second surveillance device within a predefined zone area;
   comparing characteristics of the first and second sets of objects, wherein the characteristics are based upon a set of predetermined characteristics;
   comparing characteristics of the objects within the first set of objects to characteristics of the objects within the second set of objects, wherein the characteristics are based upon a set of predetermined characteristics; and
   determining if the first set of objects identified by the first surveillance device corresponds to the second set of objects identified by the second surveillance device; and classifying each object identified by the first surveillance device according to rather is corresponded to an object identified by the second surveillance device; wherein the second surveillance device provides a video feed of a field-of-view of the predefined zone area; the objects identified by the first surveillance device comprises at least one of an active identification device or a passive identification device, wherein each first surveillance device comprises an associated profile.

12. The method of claim 11, wherein the video feed is used to construct a 2D map of the predetermined zone area featuring the location of the objects present in the video feed.

13. The method of claim 11, further including the step of utilizing object location data acquired from the first surveillance device in conjunction with video feed data of the objects acquired from the second surveillance device in order to construct a 3D map of the predetermined zone area.

14. The method of claim 13, further including the step of tracking the movements of the received objects and displaying each object's or a compilation of at least two objects' respective path and time of movement on the 3D map of the zone area.

15. The method of claim 11, wherein the step of receiving objects or sets of objects comprises receiving information or data corresponding to objects or sets of real objects from sensors, or from data storage means or communication means operatively associated with such sensors, and processing such information in a computer system.

16. The method of claim 11, further including the step of determining the number of objects within the first set of objects that have been received by the first surveillance device.

17. The method of claim 16, further including the step of determining the number of objects within the second set of objects that have been identified by the second surveillance device.

18. The method of claim 17, further including the step of comparing the number of objects received by the first surveillance device to the number of objects received by the second surveillance device in order to determine if the number of received objects are equal or not equal.

19. The method of claim 18, wherein if it is determined that the number of objects received at the first and second surveillance devices are equal then no action is taken.

20. The method of claim 18, wherein if it is determined that the number of objects received at the first and second surveillance devices are not equal then an alarm condition is initiated.

21. The method of claim 11, wherein the first surveillance device and the second surveillance device are different types of devices.

22. A system for the classification of an individual or object within a zone of a specified area with multiple surveillance devices, the system comprising:
a first surveillance device operative for observing a first set of objects within a predefined zone area;
a second surveillance device operative for observing a second set of objects within a predefined zone area; and
a processor in communication with the first surveillance device and the second surveillance device, the processor operative for receiving the first and second sets of objects, filtering out any incomparable objects, comparing characteristics of the filtered first and second sets of objects, and further comparing characteristics of the objects within the first set of objects to characteristics of the objects within the second set of objects, wherein the characteristics are based upon a set of predetermined characteristics, the processor further determining if each object in the first filtered set of objects identified by the first surveillance device corresponds to an object in the second filtered set of objects identified by the second surveillance device; and classifying each object identified by the first surveillance device according to rather is corresponded to an object identified by the second surveillance device; wherein the second surveillance device provides a video feed of a field-of-view of the predefined zone area; the objects identified by the first surveillance device comprises at least one of an active identification device or a passive identification device, wherein each first surveillance device comprises an associated profile.

23. The system of claim 22, wherein the first and second surveillance devices determines the location of the received objects within the predefined zone area.

24. The system of claim 22, wherein the video feed is used to construct a 2D map of the predetermined zone area featuring the location of the objects present in the video feed.

25. The system of claim 22, wherein object location data acquired from the first and second surveillance devices is used in conjunction with video feed data of the objects acquired from the second surveillance device in order to construct a 3D map of the predetermined zone area, the friendly and unfriendly objects situated within the zone area being displayed upon the 3D map.

26. The system of claim 25, wherein each friendly and unfriendly objects' respective path of movement and the time of the object's movement are tracked and displayed on the 3D map of the zone area.

27. The system of claim 22, wherein the processor is further operative for receiving information or data corresponding to the first and second sets of objects or sets of real objects from the first and second surveillance devices, or from data storage means or communication means operatively associated with the first and second surveillance devices.

28. The system of claim 22, wherein it is determined if an object received by the first surveillance device as is within a predetermined distance from an object received by the second surveillance device.

29. The system of claim 22, wherein if it is determined that an object received by the first surveillance device is within a predetermined distance from an object received by the second surveillance device, then the two objects are assumed to be the same object.

30. The system of claim 29, wherein if the two objects are determined to be the same object then the object received by the second surveillance device is assigned with a profile of the object identified by the first surveillance device.

31. The system of claim 30, wherein if it is determined that an object has a corresponding profile, then no action is taken and the object is classified as a friendly object.

32. The system of claim 30, wherein if it is determined that an object does not have a corresponding profile, then an alarm condition is initiated and the object is classified as an unfriendly object.

33. The system of claim 22, wherein the first surveillance device and the second surveillance device are different types of devices.

34. A system for the classification of an individual or object within a zone of a specified area with multiple surveillance devices, the system comprising:
a first surveillance device operative for observing a first set of objects within a predefined zone area;
a second surveillance device operative for observing a second set of objects within a predefined zone area; and
a processor in communication with the first surveillance device and the second surveillance device, the processor operative for receiving the first and second sets of objects, filtering out any incomparable objects, comparing characteristics of the filtered first and second sets of objects, and further comparing characteristics of the objects within the first set of objects to characteristics of the objects within the second set of objects, wherein the characteristics are based upon a set of predetermined characteristics, the processor further determining if the filtered first set of objects identified by the first surveillance device corresponds to the filtered second set of objects identified by the second surveillance device; and classifying each object identified by the first surveillance device according to rather is corresponded to an object identified by the second surveillance device; wherein the second surveillance device provides a video feed of a field-of-view of the predefined zone area; the objects identified by the first surveillance device comprises at least one of an active identification device or a passive identification device, wherein each first surveillance device comprises an associated profile.

35. The system of claim 34, wherein the video feed is used to construct a 2D map of the predetermined zone area featuring the location of the objects present in the video feed.

36. The system of claim 35, wherein object location data acquired from the first and second surveillance devices is used in conjunction with video feed data of the objects acquired from the second surveillance device in order to construct a 3D map of the predetermined zone area.

37. The system of claim 36, wherein each object's respective path of movement and the time of the received an object's or a compilation of at least two objects' movements are tracked and displayed on the 3D map of the zone area.

38. The system of claim 34, wherein the number of objects within the filtered first set of objects that have been received by the first surveillance device is determined.

39. The system of claim 38, wherein the number of objects received by the first surveillance device is compared to the number of objects received by the second surveillance device in order to determine if the number of received objects are equal or not equal.

40. The system of claim 39, wherein if it is determined that the number of objects received at the first and second surveillance devices are equal then no action is taken.

41. The system of claim 39, wherein if it is determined that the number of objects received at the first and second surveillance device are not equal then an alarm condition is initiated.

42. The system of claim 41, wherein if it is determined that the number of objects received at the first and second surveillance devices are not equal then an alarm condition is initiated.

43. The system of claim 42, wherein the video feed is used to construct a 2D map of the predetermined zone area featuring the location of the objects present in the video feed.

44. The system of claim 43, wherein object location data acquired from the first and second surveillance devices is used in conjunction with video feed data of the objects acquired from the second surveillance means in order to construct a 3D map of the predetermined zone area.

45. The system of claim 44, wherein each object's respective path of movement and the time of the received object's movements or a compilation of at least two objects' movements are tracked and displayed on the 3D map of the zone area.

46. The system of claim 34, wherein the processor is further operative for receiving information or data corresponding to the first and second sets of objects or sets of real objects from the first and second surveillance devices, or from data storage means or communication means operatively associated with the first and second surveillance device.

47. The system of claim 34, wherein the first surveillance device and the second surveillance device are different types of devices.

* * * * *